UNITED STATES PATENT OFFICE 2,314,305

MONO-ETHERS OF CHLORO-ALKYL ACETALS

Edgar C. Britton and Clarence L. Moyle, Midland, Mich., assignors to The Dow Chemical Company, Midland, Mich., a corporation of Michigan No Drawing. Application February 6, 1941, Serial No. 377,655

6 Claims. (Cl. 260—613)

This invention concerns mono-ethers of chloro-alkyl acetals having the general formula:—

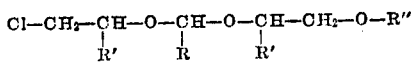

where R and R' each represent a member of the group consisting of hydrogen and an alkyl radical containing not more than 3 carbon atoms and R'' represents a member of the group consisting of monovalent aliphatic radicals and aromatic radicals.

Examples of preferred compounds are those wherein R represents the methyl radical, R' represents hydrogen, and R'' represents a phenyl radical although R may also represent the ethyl, propyl, or butyl radicals, R' may also represent an alkyl radical, and R'' may also represent an aliphatic radical and other aromatic radicals, such as those derived from hydroxy biphenyl, halophenols, alkyl phenols, phenol sulfonic acids, salicylic acid derivatives, hydroxy phenyl sulfones, hydroxy phenols, hydroxy aromatic ketones, etc.

The new mono-ethers of chloro-alkyl acetals are high boiling compounds with a sweet odor. They vary in color from colorless to pale yellow. The compounds have insecticidal properties. They may also be used as intermediates in the preparation of sulfites, amines, sulfides, and esters by reaction of the remaining halogen with sodium sulfite, amines or ammonia, sodium sulfide, and metallic salts of acids respectively.

The new compounds may be prepared by reacting sodium phenate or alcoholate with a molar equivalent or more of a di-(beta-chloroalkyl) acetal at a temperature of approximately 50°–120° C. for 5–20 hours. A desirable temperature is that at which gentle reflux occurs. When the reaction is complete, water is added to dissolve the salt formed. The oil layer is then separated and distilled to produce the desired product.

The following examples illustrate a number of ways in which the principle of the invention may be employed, but are not to be construed as limiting the invention.

Example 1

A mixture of 81 grams (0.4 mol) of the sodium salt of 2-hydroxy-diphenyl and 149 grams (0.8 mol) of bis-beta-chloroethyl acetal was stirred and gently refluxed for 20 hours at 110° C. The salt formed was dissolved in 150 c. c. of water. The oil which separated was distilled to obtain 1-(2-chloroethoxy)-1-(2-(2-xenoxy)-ethoxy)-ethane having the formula:

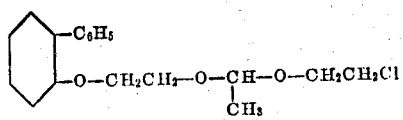

This compound is a pale yellow, slightly viscous liquid having a sweet odor. It has a boiling point of 212°–221° C. at 7 mm. pressure, a specific gravity at 25°/20° of 1.130, and a refractive index at 25° of 1.5718.

Example 2

A mixture of 79 grams (0.4 mol) of 2,4,6-trichloro phenol, 80 c. c. (0.4 mol) of a 20 per cent aqueous sodium hydroxide solution, and 149 grams (0.8 mol) of bis-beta-chloroethyl acetal was refluxed at 103°–105° C. for 10 hours. The resulting oil was washed with water and distilled. The product was 1-(2-chloroethoxy)-1-(2-(2,4,6-trichloro-phenoxy)-ethoxy)-ethane, having the formula:

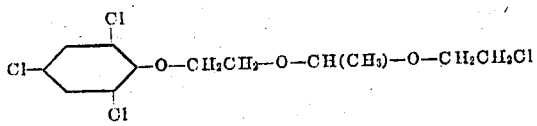

This compound is a pale yellow mobile liquid having a faint sweet odor. It has a boiling point of 199°–201° C. at 6 mm. pressure, a specific gravity at 25°/20° of 1.364, a refractive index at 25° of 1.5308, and an observed molecular refraction of 78.93 (calculated=78.83).

Example 3

A mixture of 51.4 grams (0.4 mol) of para-chlorophenol, 149 grams (0.8 mol) of bis-beta-chloroethyl acetal, 80 c. c. (0.4 mol) of a 20 per cent aqueous sodium hydroxide solution was refluxed at 107°–108° C. for 12 hours. The resulting oil was washed with water and distilled. The product was 1-(2-chloroethoxy)-1-(2-(4-chlorophenoxy)-ethoxy)-ethane, having the formula:

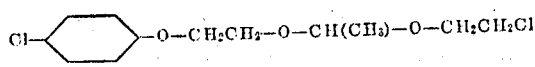

This compound is a pale yellow mobile liquid which crystallized on standing. It has a boiling point of 177°–179° C. at 6 mm. pressure, a specific gravity at 25°/20° of 1.210, and a refractive index at 25° of 1.5172.

Example 4

A mixture of 38.6 grams (0.3 mol) of para-chlorophenol, 104 grams (0.6 mol) of bis-beta-chloroethyl formal, and 60 c. c. (0.3 mol) of a 20 per cent aqueous sodium hydroxide solution was refluxed at 110°–119° C. for 6 hours. The oil layer was distilled to yield 1-(2-chloroethoxy)-1-(2-(4-chlorophenoxy)-ethoxy)-methane, having the formula:

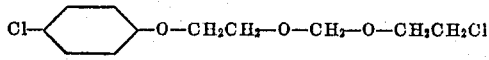

The product is a pale yellow mobile liquid with a sweet sickening odor. It has a boiling point of 174°–181° C. at 5.7 mm. pressure, a specific gravity at 25°/20° of 1.24, and a refractive index at 25° of 1.522.

Example 5

A mixture of 32.4 grams (0.3 mol) of ortho-cresol, 104 grams (0.6 mol) of bis-beta-chloroethyl formal, and 60 c. c. (0.3 mol) of aqueous sodium hydroxide was refluxed at 109°–110.5° C. for 6 hours. The oil layer was distilled to obtain 1-(2-chloroethoxy)-1-(2-(2 - tolyloxy) - ethoxy)-methane, having the formula:

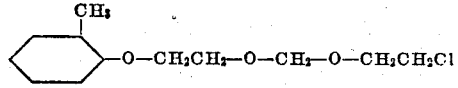

The product is a very pale yellow mobile liquid with a faint sweet odor. It has a boiling point of 160°–165° C. at 6 mm. pressure, a specific gravity at 25°/20° of 1.14, and a refractive index at 25° of 1.5082.

Example 6

11.5 grams (0.5 mol) of sodium was reacted with 222 grams (3 mols) of n-butyl alcohol and the solution was added immedately at 25° C. to 187 grams (1 mol) of di-(beta-chloroethyl) acetal, the mixture was stirred at 50°–55° C. for 1.25 hours and then at 70° for 4 hours. The crude product was washed with water and distilled to obtain 1-(2-n-butoxy-ethoxy)-1-(2-chloroethoxy)-ethane, having the formula:

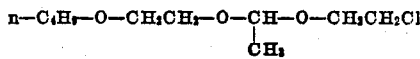

This compound is a colorless mobile oil with a boiling point of 125°–130° C. at 13 mm. pressure, a specific gravity at 25°/25° of 1.01, a refractive index at 25° of 1.4349, and an observed molecular refraction of 58.2 (calculated=58.2).

Other mono-ethers of chloro-alkyl acetals of the present invention are 1-(2-chloropropoxy)-1-(2-p-bromophenoxyethoxy) butane, 1-(2-chloroethoxy)-1-(2-phenoxyethoxy) ethane, 1-(2-chloroethoxy)-1-(2-(4 - carboxyphenoxy) - ethoxy) ethane, etc.

We claim:

1. A mono-ether of a chloro-alkyl acetal, said compound having the general formula:

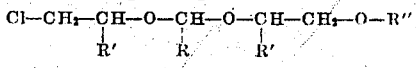

wherein R and R' each represents a member of the group consisting of hydrogen and alkyl radicals containing not more than 3 carbon atoms and R'' represents a member of the group consisting of monovalent aliphatic radicals and aromatic radicals.

2. A mono-ether of a chloro-alkyl acetal, said compound having the general formula:

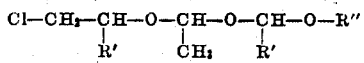

wherein R' represents a member of the group consisting of hydrogen and alkyl radicals containing not more than 3 carbon atoms and R'' represents a member of the group consisting of monovalent aliphatic radicals and aromatic radicals.

3. A mono-ether of a chloro-alkyl acetal, said compound having the general formula:

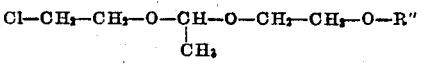

wherein R'' represents a member of the group consisting of monovalent aliphatic radicals and aromatic radicals.

4. 1-(2-chloroethoxy)-1-(2-(2 - xenoxy) - ethoxy) ethane.

5. 1-(2-chloroethoxy)-1 - (2 - phenoxyethoxy) ethane.

6. 1-(2-chloroethoxy) - 1-(2-(2,4,6 - trichlorophenoxy)-ethoxy) ethane.

EDGAR C. BRITTON.
CLARENCE L. MOYLE.